Oct. 7, 1958   E. DOUGLASS   2,855,180
TIRE SPREADING DEVICE
Filed Aug. 2, 1952   2 Sheets-Sheet 2
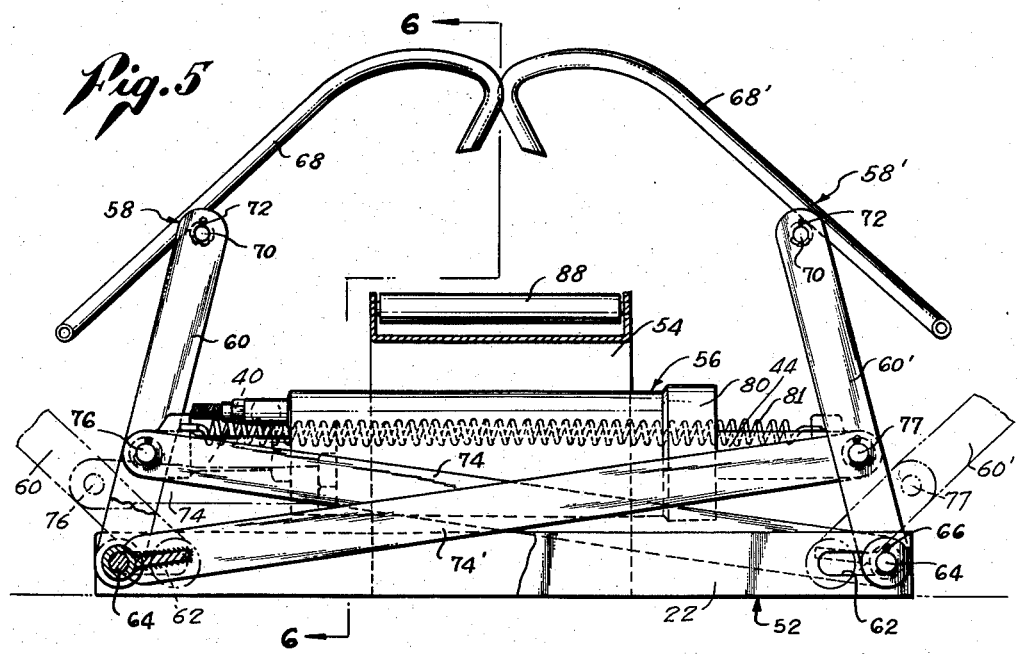
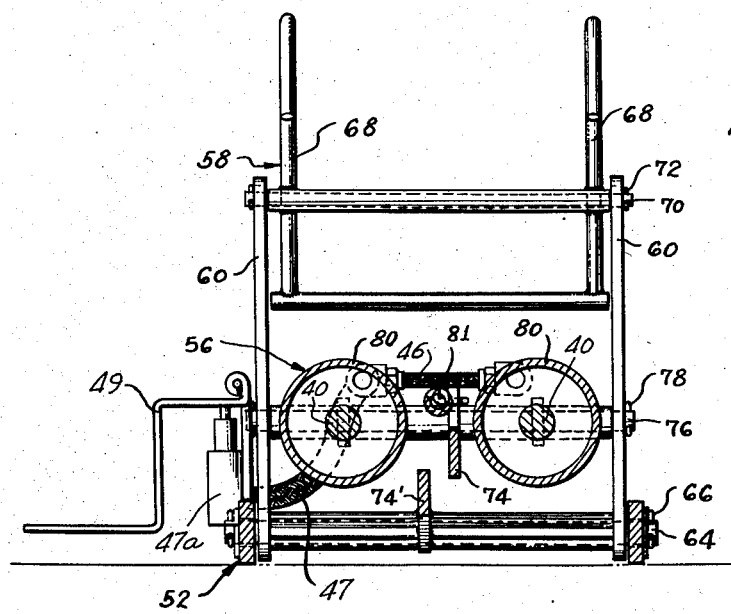
INVENTOR.
ERNEST DOUGLASS
BY Fulwider & Mattingly
Attorneys United States Patent Office 2,855,180
Patented Oct. 7, 1958

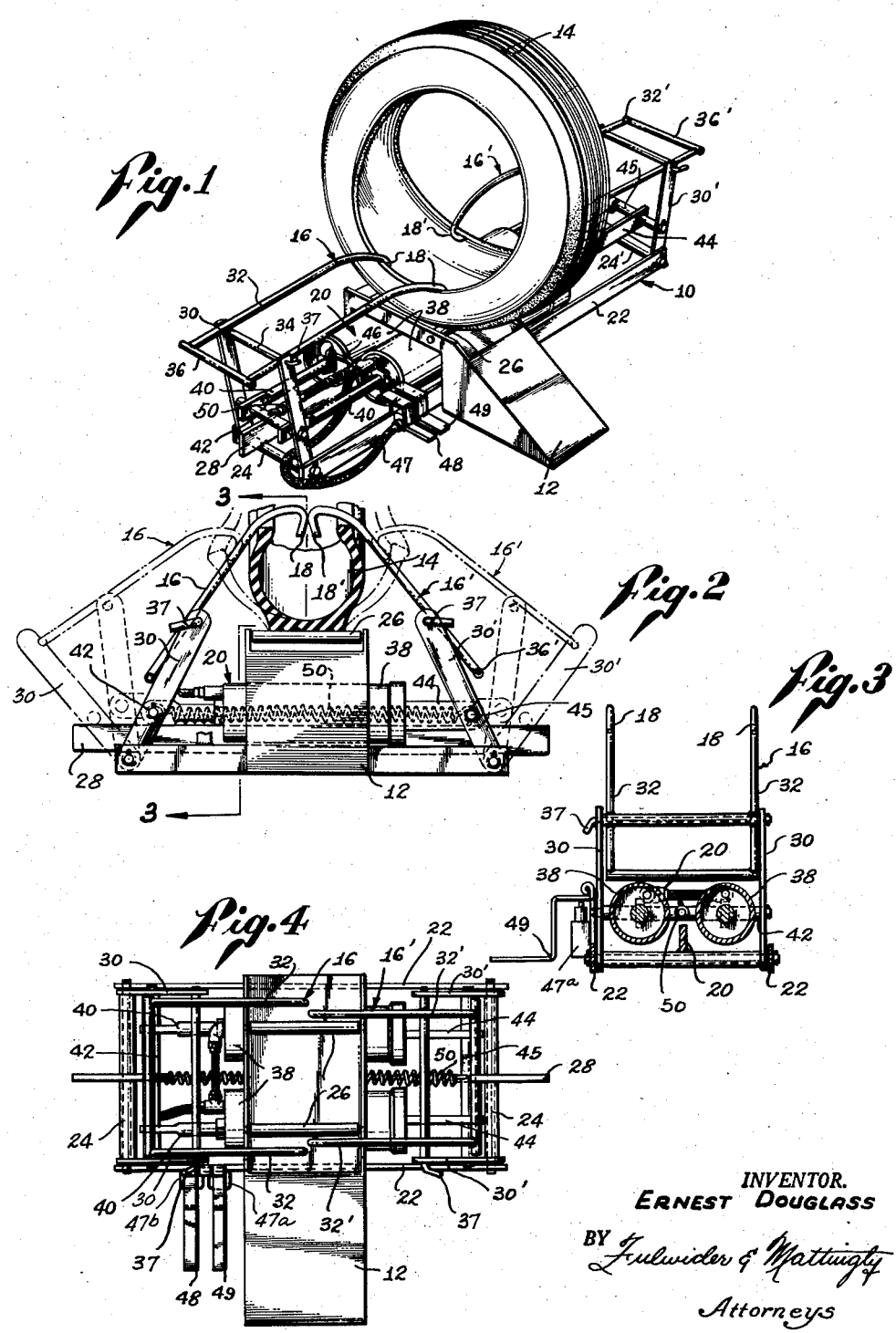

2,855,180

TIRE SPREADING DEVICE

Ernest Douglass, Pomona, Calif., assignor, by mesne assignments, to Amber Duck Products Corporation Application August 2, 1952, Serial No. 302,297

4 Claims. (Cl. 254—50.3)

The present invention relates generally to the field of pneumatic tires, and more particularly to a novel device for spreading apart the side walls of tires.

Modernly there are utilized on the wheels of automobiles, trucks, tractors, aircraft, and the like, millions of pneumatic tires each year. It often becomes necessary when using such tires to spread apart their side walls for removing an inner tube from the tire, for inspection of the side walls of the tire, and for repairing the body of the tire. Additionally, where the tire is vulcanized in a tire repair shop it becomes necessary to spread apart the side walls thereof for the purpose of removing the air bags utilized in such vulcanization process. This tire spreading operation when accomplished manually is a time-consuming and tedious process, especially where tires of any appreciable size and weight are encountered. Moreover, the manual spreading apart of the tires often involves danger of cuts and bruises to the person performing such task.

It is a major object of the present invention to provide a novel tire spreading device which is power-operated whereby the tire spreading operation may be accomplished in less time and with far less effort than is possible when this operation is performed manually.

Another object of the present invention is to provide a tire spreading device which permits the tire spreading operation to be carried out without danger to the person performing the task.

A further object of this invention is to provide a tire spreading device which is compact in design, light in weight, and does not require anchoring to a permanent foundation whereby it may be of a portable nature.

It is another object of the present invention to provide a tire spreading device which eliminates the necessity of lifting a tire during a tire spreading operation. This is an important feature in view of the great weight of the larger sizes of tires.

Yet a further object of the present invention is to provide a tire spreading device which will not damage either a tire being spread or an inner tube or air bag disposed within such tire.

Another object of the present invention is to provide a tire spreading device which utilizes compressed air as an actuating medium whereby it may be connected to the already existing compressed air system of a conventional service station or garage.

It is yet a further object of the present invention to provide a tire spreading device which is easy to operate, even by those having no particular training or skill in the handling of power-operated machinery.

An additional object of the present invention is to provide a tire spreading device which is simple of design and sturdy of construction whereby it may have a long service life.

Other objects and advantages of the present invention will become apparent from the following detailed description taken in conjunction with the accompanying drawings wherein:

Figure 1 is a general perspective view showing a preferred form of tire spreading device embodying the present invention;

Figure 2 is a side view of the device disclosed in Figure 1 showing the mode of operation of such device;

Figure 3 is a vertical sectional view taken on line 3—3 of Figure 2;

Figure 4 is a top plan view of the tire spreading device shown in the preceding figures;

Figure 5 is a side view of a second form of a tire spreading device embodying the present invention; and Figure 6 is a vertical sectional view taken on line 6—6 of Figure 5.

Referring to the drawings, and particularly to Figures 1 to 4 thereof, the preferred form of tire spreading device embodying the present invention broadly comprises a longitudinally extending frame 10 adapted to rest upon the ground, and formed at its mid-portion with a transversely-disposed inclined ramp 12 by means of which a tire to be spread 14 may be moved into position to be operated upon; a pair of spreader assemblies 16 and 16' connected to opposite ends of the frame 10 and having hooked portions 18 and 18' engageable with opposite side walls of the tire 14; and force-applying means 20 carried between the spreader members and adapted to effect movement of the spreader assemblies in opposite directions whereby to spread apart the opposite side walls of the tire 14.

More particularly, the frame 10 will preferably comprise a pair of longitudinally extending side rods 22 connected at their opposite ends by means of cross bars 24 and 24'. The inclined ramp 12 may be formed of sheet metal and will preferably mount a pair of longitudinally extending rollers 26, which rollers are adapted to serve as a platform which receives the lower segment of the tire 14 so as to hold it in the proper position during a tire spreading operation. A longitudinal rod 28 is shown rigidly affixed to the cross bars 24 and 24'. This rod serves the dual function of a frame strengthening member as well as a limit stop means for the spreader assemblies 16 and 16'; this latter function to be set forth more fully hereinafter.

The spreader assemblies 16 and 16' should be identical in construction and include a pair of vertically extending rocker arms 30 and 30' shown pivotally connected at their lower ends to the opposite ends of the side bars 22, and a pair of elongated hook elements 32 and 32' pivotally connected to the upper end of the rocker arms 30 and 30'. As shown clearly in Figure 2, the length of each rocker arm approximates one-half the length of the rods 22. It will be seen that each of the hook elements are formed at their inner ends with the aforementioned tire-engaging hook portions 18 and 18'. Preferably, these hook elements 32 and 32' will be formed with at least two transverse sockets along their length whereby their respective length may be varied. In this manner provision may be made for tires of different widths. To this end, each of the pair of hook elements are seen to include a first crosspiece 34 spaced inwardly from the ends of the hook element, and a second socket or crosspiece 36 secured to the ends thereof. Each of these sockets or crosspieces are tubular whereby they may receive a pin element 37, which pin element is insertable through bores formed in the upper end of the rocker arm 30 and 30'. These pin elements should be understood to be selectively insertable within either one of the crosspieces 34 or 36 whereby to vary the effective length of the hook elements. Thus, if a tire of extra width is to be spread, the pin elements 37 will be disposed in crosspieces 34, as shown in the drawings. If, however, a tire of normal width is to be spread, these pin elements may be removed from crosspieces 34 and inserted within crosspieces 36.

The force-applying means 20 will preferably comprise a pair of conventional fluid-actuated cylinder and piston combinations. The cylinders 38 of such combinations are each shown as rigidly mounting at their head end, a longitudinal rod 40, which rod is pivotally connected at its end remote from the cylinder to a transverse spacer bar 42 mounted upon the intermediate portion of the vertically extending rocker arm 30. The piston rods 44 are shown pivotally connected to a similar spaced bar 45 mounted between the other pair of vertically extending rocker arms 30'. At their opposite ends the piston rods are rigidly affixed to a piston (not shown) that is slidably mounted within each of the cylinders 38. The heads of the cylinders 38 are shown connected by piping 46 to a common fluid conduit 47, which conduit is connected to a pair of control valve elements 47a and 47b. The control valve elements are connectible to a source of fluid that is under positive pressure (not shown). Control of such fluid under pressure may be effected by means of a pair of foot pedals 48 and 49, one pedal 48 being depressed to admit pressurized fluid into the conduit 47 and the other pedal 49 being depressed to release such fluid therefrom. It has been found desirable to use compressed air as the actuating medium for the cylinder and piston combination. This is particularly advisable in view of the existence of compressed air systems in the vast majority of existing service stations and garages.

It should be especially noted that there is no direct connection between the two cylinder and piston combinations and the frame 10. Instead, these cylinder and piston combinations are mounted solely by virtue of their connection to the spacers 42 and 45. Accordingly, at such time as fluid is admitted into the head ends of the cylinders 38, an equal amount of pressure will be exerted upon the head end wall of the cylinders and the left surface of the pistons. The cylinders will therefore be urged to the left and the pistons to the right with equal force. Accordingly, the cylinder and piston rods 40 and 44 must necessarily exert an equal and opposite outward force upon the vertically extending rocker arms. This arrangement effects a decided advantage inasmuch as it insures that the hook portions 18 and 18' of the spreader members will each impose substantially the same amount of spreading force upon the side walls of the tire 14 during a tire spreading operation. In this manner, the likelihood that one spreader member might exert an excessive amount of force upon the side wall of the tire with which it is engaged is eliminated. Although it is possible to arrange the cylinder and piston combination to be fluid actuated in both directions, it has been found more economical and practical to effect a return movement by mechanical means, such as by means of a helical tension spring 50 shown interposed between the spacer bars 42 and 45.

In the operation of the preferred embodiment, after the tire 14 has been positioned upon the rollers 26 and the hooked portions 18 and 18' of the spreader members have been engaged with the side walls of the tire, the foot pedal 48 may be depressed so as to admit compressed air within the cylinders 38. The admission of such air will effect the relative longitudinal movement of the cylinders and the pistons whereby the vertically extending rocker arms 30 and 30' will be moved from their innermost position, indicated by the solid line in Figure 2, to their outermost position indicated by the broken line in this figure. As will also be clear from this figure, the free ends of the rocker arms move downwardly as well as outwardly as they travel outwardly from the vertical. It will be observed that outward movement of these arms will be limited by the engagement of the spacer bars 42 and 45 with the limit stop rod 28 mentioned previously. Such outward movement of the vertically descending arms will be seen to effect a corresponding movement of the hook elements 32 and 32' whereby the hook portions 18 and 18' thereof will spread the side walls of the tire apart, as indicated in Figure 2. With reference to this figure, it should here be noted that the foot pedals 48 and 49 have been eliminated in the interest of clarity.

After the side walls of the tire have been spread apart whereby the desired steps may be taken with regard thereto, as for example the removal of an inner tube, or the inspection or repair thereof, the other foot pedal 49 may be depressed so as to release the air previously admitted to the cylinders 38. The helical tension spring 50 will then effect the return of the vertically extending rocker arms 30 and 30' and their attached hook elements 32 and 32' to their original positions. The tire 14 may then be rotated so as to dispose another segment thereof within the rollers 26, or else it may be rolled down the ramp 12 and another tire substituted in its place.

Referring now to Figures 5 and 6, the second form of tire spreading device embodying the present invention is seen to be generally similar in overall appearance to the aforedescribed preferred embodiment. Thus, it includes a longitudinally extending frame 52 adapted to rest upon the ground and having a transversely-disposed inclined ramp 54 by means of which a tire to be spread may be disposed at the mid-portion of the frame. This form of the invention also utilizes a pair of cylinder and piston combinations 56 as force-applying means for a pair of spreader members 58 and 58'. These cylinders are connected by piping 46 to a common fluid conduit 47, which conduit is connected to a pair of control valve elements 47a and 47b. This arrangement is similar to that shown in Figures 1 through 4, the control valve elements being connectible to a source of fluid that is under positive pressure (not shown). Such fluid may be compressed air. The control valve elements are controlled by foot pedals 48 and 49.

It should be observed that the construction of the spreader members 58 and 58' of this form of the invention differs from the construction of the spreader assemblies 16 and 16' heretofore described. Thus, the spreader assemblies 58 and 58' are seen to comprise a pair of vertically extending rocker arms 60 and 60' each having its lower end slidably affixed to a longitudinally extending slot 62 formed in the opposite ends of the frame 52, as by means of a transverse cross-bar 64 held within the slots by a cotter pin 66. The upper ends of these vertically extending rocker arms 60 and 60' are seen to be pivotally connected to a pair of hook elements 68 and 68' similar to those described in conjunction with the preferred embodiment of the invention. The connection between these arms and the hook elements may take the form of a second transverse pin 70 held in place by means of cotter pins 72. The intermediate portions of the vertically extending arms 60 and 60' are shown as being interconnected by a pair of rigid links 74 and 74' to which end the intermediate portions of the vertically extending rocker arms are shown provided with transverse spacer bars 76 and 77 held in place by cotter pins 78. A helical tension spring 81 is shown interposed between these transverse spacer bars 76 and 77.

The operation of this second form of the invention is substantially identical to that of the aforedescribed preferred form. Hence, upon admission of compressed air within the cylinders 80 by depression of foot pedal 48, there will be effected relative longitudinal separation between the cylinders 80, rods 40 affixed thereto, and the piston rods 44. Such movement will effect simultaneous longitudinal movement of the vertically extending rocker arms 60 and 60' and hook elements 58 and 58' from their solid line position of Figure 5 to their broken line showing therein. In this manner the side walls of a tire (not shown) disposed upon the rollers 88 may be spread apart. Return of the rocker arms 60 and 60' and the hook elements 58 and 58' may be effected by means of the helical tension spring 81.

It should be particularly noted that it is possible to utilize this second form of construction to provide a tire spreading device of shorter length than where the preferred form of construction is utilized. This is made possible by the use of the vertically extending rocker arms 60 and 60' interconnected by the pair of rigid links 74 and 74', whereby the vertically extending rocker arms need travel a shorter longitudinal distance in order to effect the required longitudinal movement of the hook portions of the hook elements 68. The advantages of reduced length include a savings in weight, a reduction in cost and an increase in handling ease.

It will be apparent to those skilled in the art that various changes and modifications may be made with regard to the foregoing construction without departing from the spirit of the invention or the scope of the appended claims.

I claim:

1. A tire spreading device, comprising: a longitudinally extending, low profile frame including a pair of parallel ground-engaging side rods; a fixed, transversely extending tire-receiving platform disposed over the midportion of said side rods; a pair of spreader members, each including a pair of transversely aligned rocker arms mounted at their lower ends for pivotal movement with respect to one end of said side rods, the length of said rocker arms approximating one-half the length of said side rods and the free end of said rocker arms being movable in a longitudinal direction relative to said side rods towards and away from said tire-receiving platform, each spreader member also including a transverse spacer bar rigidly interconnecting the intermediate portion of each of said pairs of rocker arms, each spreader member further including an elongated hook element pivotally connected to the free end of one of said pairs of rocker arms and engageable with the side walls of a tire resting upon said tire-receiving platform; longitudinally extending, fluid-actuated cylinder and piston means disposed above said side rods but below said platform; first and second rod means extending from said cylinder and said piston means, said first rod means being pivotally connected to one of said spacer bars and said second rod means being pivotally connected to the opposite spacer bar; control valve means connectible to a source of fluid pressure; and piping connecting said control valve means to said cylinder means, the introduction of pressurized fluid into said cylinder means effecting equal and opposite movement between the free ends of said rocker arms whereby the free ends of said rocker arms will be moved outwardly and downwardly relative to said platform and the proximate ends of said hook elements will exert concurrent outward and downwardly directed force upon the sidewalls of a tire resting upon said platform.

2. A tire spreading device as set forth in claim 1 wherein said spacer bars are interconnected by tension spring means.

3. A tire spreading device as set forth in claim 1 wherein said hook elements are each provided with a plurality of longitudinally spaced sockets selectively connectible to the free ends of said rocker arms.

4. A tire spreading device as set forth in claim 1 wherein the ends of said side rods are formed with horizontal slots that slidably receive a pair of transverse cross-bars each of which has pivotally connected thereto the lower end of one of said pairs of rocker arms and said device further includes first and second rigid links, said first link being pivotally connected to one of said cross-bars at one of its ends and at its opposite end to the intermediate portion of one of the rocker arms disposed at the other end of said frame, and said second link likewise being pivotally connected to the other of said cross-bars at one of its ends and at its opposite end to the intermediate portion of one of the rocker arms disposed at the opposite end of said frame.

References Cited in the file of this patent

UNITED STATES PATENTS

| | | |
|---|---|---|
| 1,848,961 | Manley | Mar. 8, 1932 |
| 2,310,891 | Branick | Feb. 9, 1943 |
| 2,347,311 | Branick | Apr. 25, 1944 |
| 2,375,595 | Stoehr | May 8, 1945 |
| 2,496,389 | Goodman | Feb. 7, 1950 |
| 2,567,681 | Schwartz et al. | Sept. 11, 1951 |

FOREIGN PATENTS

| | | |
|---|---|---|
| 599,037 | Great Britain | Mar. 3, 1948 |